United States Patent [19]
Mack

[11] 3,815,264
[45] June 11, 1974

[54] HOBBY KIT FOR SCULPTURING

[76] Inventor: William S. Mack, 4701 Poplar Br. Rd., Minneapolis, Minn. 55431

[22] Filed: July 31, 1972

[21] Appl. No.: 276,375

[52] U.S. Cl............... 35/26, 35/41, 156/63, 161/159
[51] Int. Cl. ........................................... G09b 11/00
[58] Field of Search.......... 35/7 R, 24 R, 26, 27, 40, 35/62, 41, 73; 40/125 F, 143; 85/10 R; 116/136; 273/102 B; 33/169 B; 156/59, 63

[56] References Cited
UNITED STATES PATENTS

| | | | |
|---|---|---|---|
| 1,061,804 | 5/1913 | Bannan | 35/26 UX |
| 1,248,340 | 11/1917 | Kinney | 33/169 B |
| 2,937,931 | 5/1960 | Nugent | 35/26 |
| 3,358,389 | 12/1967 | Ruderfer | 35/24 R |

FOREIGN PATENTS OR APPLICATIONS 1,570,549    5/1969    France .............................. 35/26

OTHER PUBLICATIONS

Weber–Costello Quality Products Catalog WC-69, Feb. 1969, "Tackboards," page 15.

TV Guide, Feb. 19, 1972, page 10, "Pounding Home A Point".

Mill & Factory, June 1952, pp. 112, 113 only.

Primary Examiner—Harland S. Skogquist
Attorney, Agent, or Firm—Merchant, Gould, Smith & Edell

[57] ABSTRACT

Sculptures are made by inserting nails into a design base of foam plastic until further penetration of the nails is stopped a pre-determined distance from the point of penetration by either a relatively dense backing material or a sleeve on a nail.

3 Claims, 5 Drawing Figures

PATENTED JUN 11 1974 3,815,264

HOBBY KIT FOR SCULPTURING

BACKGROUND OF THE INVENTION

The hobby craft market represents a substantial commercial market. Hobby kits provide such benefits as relaxation, entertainment, education, training and physical rehabilitation.

One hobby kit which has been successfully introduced in this country has been the "paint-by-number" hobby kit. That hobby kit includes a substrate (e.g. canvas covered cardboard) upon which the painting is to be completed. A line drawing of the final design is imprinted on the substrate and various areas of the design are marked, usually numerically, to indicate the color which that portion of the design should be painted in order to achieve the desired end result. The kit further includes paints, (e.g. acrylic paints) which are numerically coded to correspond to the desired colors of the final painting. The kit includes written instructions for completing the painting and, often, a color print of the painting as it should look when completed. The painting is then completed by the individual at his own speed by following the instructions and painting the appropriate areas of the substrate with the colors indicated.

Paint-by-numbers hobby kits have achieved significant commercial success, partly because of their effectiveness in enabling persons of limited artistic ability to participate in producing paintings which they might not otherwise be able to produce because of lack of training or talent.

Sculpture is an art form related to painting. Original sculpture requires patience, training, and artistic talent. Although skilled artisans have created numerous sculptured masterpieces, the hobby industry has not been provided with a hobby kit for sculpturing that is analogous to the "paint-by-number" concept for painting.

SUMMARY OF THE INVENTION

The present invention is a hobby kit and a method by which the kit is used.

Briefly described, the present invention can be referred to as "sculpture-by-number." It involves the use of nails or the like (e.g. pins) which can be pushed or otherwise inserted into a soft background or design base upon which is pre-printed or otherwise outlined a desired sculpture design. The nails are pressed or otherwise inserted into the relatively weaker design base (e.g. a styrofoam panel) in the sequence provided for in the accompanying instructions. Each nail is pressed into its appropriate position until further penetration of the design base is prevented by some mechanical means. Two convenient methods of limiting the penetration of the nails are: (1) placing the styrofoam panel on a flat table or other hard surface with the design facing upwardly; or (2) providing the styrofoam panel with a relatively rigid backing member (e.g. wood, plastic or cardboard). In these methods, when the nails are pushed into the styrofoam, penetration by the nails is limited by the table or other backing member. Relief can be obtained by using nails of various lengths so that the elevation of the nail heads or tips above the uppermost or design-carrying surface of the foam panel will vary depending upon the length of the nail. Various planes of relief are achieved by using a number of nails of the same length in a given area and by using nails of other lengths in other areas. Desirably, the shorter nails are inserted before the longer nails. After the design is completed, the heads of the various nails can be painted according to a pre-determined plan (unless pre-colored nails have been used).

THE DRAWINGS

DETAILED DESCRIPTION

THE HOBBY KIT

Figures 1, 2, 3, 4, 5:
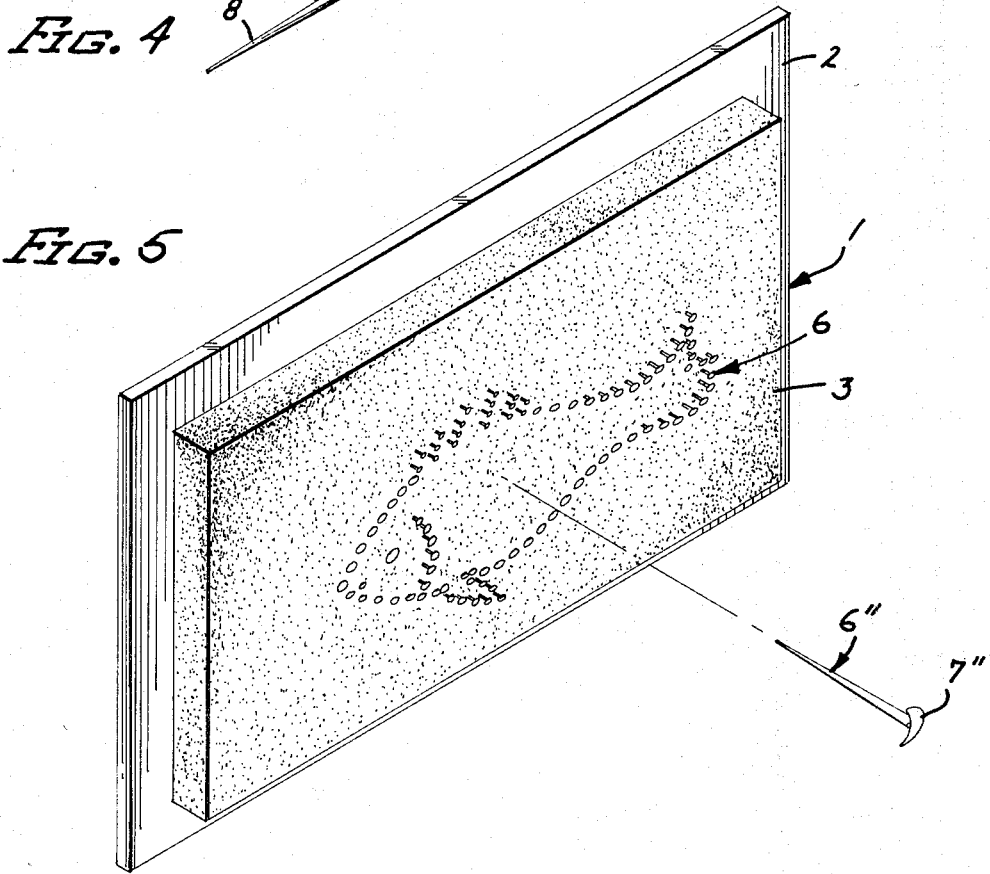
FIG. 1 is a perspective view of a flat design base upon which has been imprinted the design of a fish. The design base is mounted on a relatively more rigid or dense backing member which supports and frames the design base.
FIG. 2 is a perspective view of a cylindrical design base which is supported on a cylindrical backing member.
FIG. 3 is a perspective view of a nail.
FIG. 4 is a perspective view of a nail which has been provided with an intermediate ring to limit penetration of the nail into a design base.
FIG. 5 is a perspective view of the panel of FIG. 1 after placement of a number of nails according to a predetermined plan. One of the nails is shown in an exploded view as part of FIG. 5.

The hobby kit of the present invention will typically be packaged in a suitable container (e.g. a box). The kit will generally contain:

a. a design base upon which has been imprinted or otherwise outlined a design;

b. nails; and c. a written plan for inserting the nails into the design base.

Optionally and preferably the hobby kit will include one or both of the following additional features:

a. a backing member separate from or bonded to the design base; and b. paints for painting the heads of nails after they have been inserted in the design base.

The written plan may include instructions for painting the design as well as other optional instructions (e.g. framing the finished sculpture, caring for the finished sculpture, etc.)

These various structural features and their uses are hereinafter described in more detail.

THE DESIGN BASE

The design base can be constructed of any self-supporting material which possesses the desired properties of: (a) being soft or weak enough to permit nails to be forced into the design base; and, (b) being sufficiently strong to maintain the integrity of the final sculpture after all of the nails have been inserted. Materials of construction for the design base include plastic foams such as polyurethane foam and styrofoam (which may be open cell or closed cell foam), balsa wood, and the like. Rigid styrofoam is preferred.

Although the design-carrying surface of the design base is desirably flat for many purposes, it may be contoured for special effect. Thus, the design-carrying surface of the design base may be curved or planar or otherwise (e.g. stepped).

Desirably, the reverse side of the design base (i.e. the side opposite the design-carrying surface) will be parallel to the design-carrying surface. In a preferred embodiment, the design carrying surface and the reverse surface of the design base will be parallel planar surfaces. Such an arrangement is shown in FIG. 1. As shown in FIG. 1, a design base generally designated by the numeral 1 is optionally and preferably adhesively bonded to and supported by a backing member 2. One surface 3 of design base 1 is imprinted with or otherwise marked with the design of a fish. The side (not shown) of design base 1 which is opposite design-carrying surface 3 is planar, is parallel to surface 3, and is adhesively bonded to backing member 2.

In FIG. 2 is shown a design base suitable for three dimensional viewing. When completed, a sculpture made from this design base can be displayed on a table or supported from a ceiling or otherwise. As shown in FIG. 2, a design base generally designated by the numeral 4 is formed in the shape of a cylinder. Design base 4 (e.g. rigid, open cell, polystyrene foam) is supported on a co-axial backing member 5.

THE BACKING MEMBER

A backing member (e.g. members 2 and 5 of FIGS. 1 and 2 respectively) is an optional but preferred feature of the present invention. Backing members can be constructed of any suitable construction material which is relatively more dense, rigid or resistant to penetration than the design base. One purpose of the backing member is to mechanically limit the extent to which nails can penetrate through the design base. Thus, the effort required to cause a nail to penetrate through a backing member should be significantly greater than the effort required to insert the nail into the design base.

Suitable materials of construction for the backing member include plastic (e.g. high density polyethylene), metal, cardboard, hardwood, and the like.

Although the design base can be bonded to the backing member by any suitable means, the use of an adhesive is preferred.

THE NAILS

The nails or pins (herein collectively referred to as "nails") which are used in the hobby kit of the present invention can be of the type commonly used for woodworking or they can be specially made for use in the present hobby kits. Light weight nails and nails with thin shanks are preferred. The nails (of which two examples are illustrated in FIGS. 3 and 4) will be constructed of a rigid material (as contrasted to the base member) and may be provided with or without heads 7 and 7' and with shaped heads 7''. Useful materials of construction include metal, plastic, etc.

To achieve variety in the final sculpture, it is necessary to either use a number of nails 6 having shanks 8 of varying lengths, or to use nails having heads 7 of various sizes or shapes, or to provide nails having mechanical stops 9 which are spaced at different intervals along shanks 8', or some combination of the foregoing. See FIGS. 3 and 4.

The use of nails of different lengths is preferred (e.g. 2-10 different lengths) as is the use of nails with several different head sizes and shapes.

SCULPTURING

Sculpturing is accomplished by the use of the present hobby kit in the following manner.

A design is printed or sprayed or otherwise applied to the design base. This design outlines the various areas of relief or pattern in the final sculpture. Each border or area of relief is designated by number or letter or other indicia to indicate a particular nail size or shape. Then, nails of the indicated type are inserted into the designated spot or area of common relief to achieve a uniform area of relief or pattern. This is accomplished by using a set of nails having a common length shank 8 as shown in FIG. 3 or by using a set of nails having the same distance between head 7' and mechanical stop 9 as shown in FIG. 4 and/or by using nails having a common head size or shape. The order and manner of inserting the nails is according to a pre-determined plan set forth in written instructions.

Each nail is pushed into its appropriate spot until it is mechanically stopped by either contact with a backing member 2 as shown in FIG. 5 or by other means such as retaining ring 9 as shown in FIG. 4. In this manner, the heads of the nails are spaced a pre-determined length away from the design-bearing surface 3 of the design base 1. Desirably, the lowest area of relief is filled in completely with its appropriate nails. Then, areas of progressively deeper relief (i.e. longer nails or longer distances between heads 7' and retaining ring 9) are completed until all of the nails have been pushed into place.

If the nails have not been pre-painted or pre-colored, paints may be provided to paint the heads of the nails to achieve a desired artistic effect. This painting may be left to individual taste or may be specified in the written hobby kit instructions.

Particularly interesting results can be obtained by using nails of different shank sizes and lengths, different head sizes and shapes (including "headless" nails) and by proper use of color.

The resulting sculpture can be framed, supported on a suitable easel or other base, or used in other manners.

What is claimed is:
1. The method of sculpturing which comprises:
   a. selecting a self-supporting design base of easily penetrable material, said base member having a relatively flat first surface on which is imprinted a design and having a second surface that is generally parallel to said first surface; said second surface being backed by a backing member that is relatively more resistant to nail penetration than the design base; and
   b. inserting nails into said design base according to a pre-determined plan, said nails being inserted until further penetration of the design base is retarded by contact of the nails with the backing member, the heads of said inserted nails being spaced a pre-determined distance away from the design bearing surface of said base and relief in said sculpture being provided by variations in the spacing between the heads of said nails and the design-bearing surface.

2. The method of claim 1 in which the predetermined plan directs that shorter nails are to be inserted into the design base before longer nails.

3. The method of claim 2 wherein heads of nails which have been inserted into the design base are painted, after insertion, according to a predetermined plan.

* * * * *